Patented June 20, 1933

1,914,364

UNITED STATES PATENT OFFICE

WILLIAM EGGERT, JR., OF BROOKLYN, NEW YORK

METHOD OF INBREEDING AND CROSS-BREEDING FOR FINER QUALITIES IN PLANTS

No Drawing.   Application filed July 29, 1932. Serial No. 626,237.

My application is for Letters Patent covering a method and means for improving the valued qualities of plants and their products as related to their spicy, agreeable flavor, taste, fragrance or color, regardless of volume, size or weight.

The improvements secured consist of strengthening the weak and delicate inclinations of plants in the developments of fine qualities.

It has been demonstrated that the plants treated by this method become more resistant to changes due to other climates and soils.

The method employed permits but limited variations and should be carefully followed to prevent insect interferences. Accurate records of results should be made and preserved.

Details of method

The first step is to select enlarged buds about to open as blossoms.

Such selected buds are preferably protected by small paper bags applied to prevent visitations from insects and should be in place not later than one day before the blossom becomes fully opened with its pollen ready for distribution.

In some cases of cross-breeding, where there is resistance, it may be that slitting the petals of the unopened bud and extracting the pollen organs will leave the proposed hybrid with no other source of pollen than will be applied when obtained from the bag-protected fully opened blossoms of the plant whose characteristic quality it is proposed to transfer and blend with those of the experimental plant.

The means and manner of preparing and applying will require considerable care and patience and the sources of supply are so numerous and varied that only one or two can be referred to in detail.

Inbreeding on this plan would be most thoroughly and successfully carried out by disciples of the late Luther Burbank whose last published address to an admiring public briefly announced that his success was always due to patience in repetitions through many generations.

The means for promoting cross breeding now offered requires but few generations before deciding that cross breeding is impossible.

The supplying of means to promote cross breeding varies according to varieties. The simplest method is to remove the pollen organs of the plant and to allow only pollen from the plant whose characteristic is to be transferred and blended. Also from the latter variety a number of protected blossoms may be taken and reduced to a paste in a mortar, adding a very small amount of a suitable solvent (at the rate of about 10 drops) to a heaping teaspoonful of paste, to facilitate extraction and promote absorption. To such a paste (about one-fourth as much in volume) there should be added saccharine material, maple syrup preferred, but no honey, as the latter might carry invisible pollen or spores of destructive fungi.

A slender brush of long soft hair conveys a few drops of the paste without dripping, which after being charged with the well mixed paste also is placed in light rolling contact with the pollen supply in other protected blossoms from which the paste originated and finally deposits its supply on the pistils of the blossom intended and prepared. A liberal coating in the heart of the flower is of advantage after the pollen-receiving organs have been covered.

A variation in some cases would be to allow the pollen organs to remain, permitting a blend of pollen from both plants. No brush of bristle or stiff hair should be used; but fine, soft-tipped feathers may serve for the application.

When cross-breeding is not the aim, the blossoms (protected preferred) of the same variety are reduced to a stiff paste in a mortar, working in a few drops of a suitable solvent, about ten drops to a teaspoonful of paste and about one-half teaspoonful of maple syrup, diluting with water to reduce to a thick syrup suitable to adhere in quantity to the brush without dripping.

The brush so charged is placed in contact with the pollen glands before anointing the pistils, thus securing pollination and contact with the stimulating preparation at the same time. Additional liberal anointing of the heart of the blossom is also useful.

The blossom so treated should be well protected by the paper bag.

Other highly flavored products of plant blossoms may be ground in with the paste; also a paste made from such alone; omitting the petals and blossoms, in some instances, results in new and very acceptable products in the first succeeding generation, usually with flavors magnified to a triple extent.

The paste remaining unused should be well diluted with water and may be applied to the roots of the plant bearing the blossoms under treatment.

It would also be of benefit to apply to the roots the treatment set forth in the Patent No. 1,686,964 granted to this applicant under date of October 9, 1928, relating to the application of solutions of the derivatives of gum benzoin to the roots of plants to induce or increase the production in the plant and its products of benzoic acid which is credited in records of researches as the principle from which the fragrance of orange blossoms is developed; and from that principle the flavors of strawberries and cranberries are also developed.

The method and means described are of wider application than for intensified fine flavors and fragrances, as they may be applied with more pronounced and rapid results in rendering the odor of the cotton blossom repellant to the boll moth by means of a paste of plant products avoided by insects, such as sassafras, and would be assisted by the root feeding of sassafras products as outlined in the cotton plant improvement Patent No. 1,698,539 dated January 8, 1929, granted to this applicant.

I therefore particularly point out and distinctly claim as my invention:

1. The method of inbreeding and developing and intensifying in plants weak inclinations toward producing aromatic desirable properties through treatments of blossoms with appropriate and preferably finer blossom products, preferably with the addition of saccharine substances at the time of pollenation of the blossoms under treatment.

2. The plant which is the product of blossoms of asexually reproduced plants treated as in claim 1, which may be evidenced by the better qualities of the extracts of the blossoms of the first-mentioned plant when used for perfuming, flavoring or medical purposes; and the succeeding generations from blossoms so treated and derived from plants capable of asexual reproduction.

3. The method for cross breeding of plants capable of asexual reproduction through treatment of blossoms at the time of pollenation, with a syrupy paste, preferably with added saccharine matter, made from blossoms of another variety of plant whose characteristics it is desired to combine with the product of the blossoms under treatment.

4. The product of blossoms of asexually reproduced plants as set forth in claim 3, embracing the pulp or edible fruit developed from the blossoms so treated; and the succeeding generations from blossoms so treated and derived from plants capable of asexual reproduction.

5. Improved products of succeeding generations of asexually reproduced plants whose improvement is traceable to the treatment of blossoms as set forth in claim 1.

6. The products resulting from blossoms of asexually reproduced plants treated, at or about the time they are pollenated, with appropriate derivatives containing the valuable and desirable qualities of other varieties of plants, according to the method embraced by claim 1.

7. The products resulting from the consequent developments of the individual blossoms of asexually reproduced plants treated by the method of claim 1.

8. The products resulting from the development, through successive generations, of blossoms of asexually reproduced plants treated as recited in claim 1.

9. A blossom of a plant which is itself the product of blossoms of asexually reproduced plants treated as in claim 1, which may be evidenced by the better qualities of the extracts from the first-mentioned blossoms when used for perfuming, flavoring or medical purposes.

10. The plant which is the product of blossoms of asexually reproduced plants treated as in claim 1, which may be evidenced by the better qualities of the extracts of the blossoms of the first-mentioned plant when used for perfuming, flavoring or medical purposes.

11. The product of blossoms of asexually reproduced plants treated as set forth in claim 3, characterized by an improved flavor in the edible portion of said product.

Signed by me this 26th day of July, 1932.

WILLIAM EGGERT, Jr.